LOW PASS FILTER CIRCUIT
Filed Feb. 28, 1968
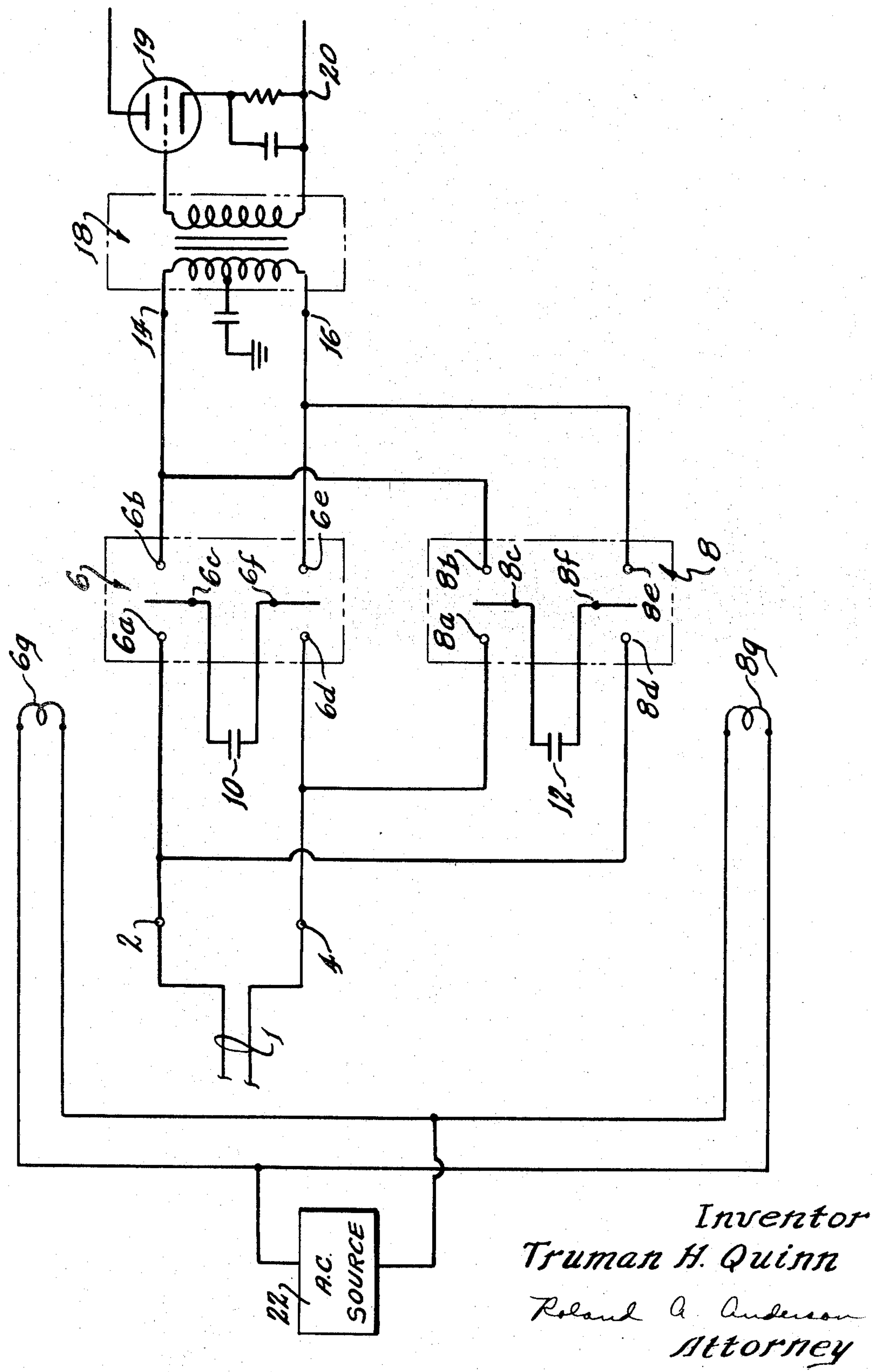
Inventor
Truman H. Quinn
Roland A. Anderson
Attorney United States Patent Office 3,535,646

Patented Oct. 20, 1970

3,535,646

LOW PASS FILTER CIRCUIT

Truman H. Quinn, Richland, Wash., assignor to the United States of America as represented by the United States Atomic Energy Commission Filed Feb. 28, 1968, Ser. No. 708,907
Int. Cl. H04b *15/00*
U.S. Cl. 328—167 3 Claims

ABSTRACT OF THE DISCLOSURE

A low pass filter circuit is interposed between a pair of signal lines and an amplifier input for rejecting large amplitude AC noise superimposed on low level DC signals. The circuit includes a pair of capacitors which are alternately switched in charging and discharging arrangement across the pair of input lines and the amplifier input, respectively, by means of two synchronized dual choppers which operate 180° out of phase.

CONTRACTUAL ORIGIN OF THE INVENTION

The invention described herein was made in the course of, or under, a contract with the United States Atomic Energy Commission.

BACKGROUND OF THE INVENTION

The present invention relates to filter circuits and in particular to filter circuits for coupling small DC signals to the input of an amplifier while rejecting large amplitude AC interference signals.

A severe problem encountered in small DC signals amplification or detection is the presence of large interference signals superimposed on the small DC signals being amplified or detected. Such interference signals may be caused by inductive, capacitive or ohmic leakage effects between signal lines carrying the small DC signals and adjacent power lines carrying large currents. For examples, in heat transfer studies involving reactor fuel elements, nuclear heat is simulated by Joule heat obtained by passing a large DC current, generated by a motor-generator set, through a fuel element mock-up. Because of rectifier ripple and commutation noise, large fluctuating eletcrostatic and magnetic fields surround the fuel element mock-up and bus bars carrying the current to the fuel element mock-up. These fields cause large interference signals in pressure and temperature transducers at the fule element mock-up and in the transducer lead wires. In one such simulation, pulsating common mode interference signals up to 400 volts have been observed in transducer leads carrying less than a one millivolt DC signal.

It has been found that conventional low-pass filtering techniques are not effective when the amplitude of the interference signals are large as compared with the amplitude of the DC signal to be amplified or detected. Furthermore, the use of conventional filtering techniques severely limits the response of the DC signal amplifying or detecting device to rapid changes in the DC signal applied to the input thereof.

It is therefore an object of the present invention to provide means for rejecting large AC interference signals in a signal line carrying a DC signal.

It is another object of the present invention to provide input circuit means to a DC signal amplifying or detecting device for low pass filtering a varying DC signal having large AC interference signals superimposed thereon while retaining satisfactory response of the amplifying or detection device to variations in the DC signal applied to the input thereof.

SUMMARY OF THE INVENTION

In accordance with the invention, a pair of capacitors are alternately connected in charging and discharging arrangement across a pair of signal lines and the input of an amplifier, respectively, by means of synchronized switches. The switches are arranged such that no direct current path exists between the signal lines and the amplifier input. The switches are further arranged such that the capacitors are discharged with opposing polarities across the amplifier input.

BRIEF DESCRIPTION OF THE DRAWING

The sole figure of the drawing is a circuit diagram illustrating the preferred embodiment of the invention.

PREFERRED EMBODIMENT OF THE INVENTION

Referring now to the figure, a pair of signal lines 1 are connected to a pair of input terminals 2 and 4. Input terminal 2 is connected to fixed contacts 6*a* and 8*d* of a pair of conventional dual electromagnetic relays or choppers 6 and 8, respectively. Input terminal 4 is connected to fixed contacts 6*d* and 8*a* of choppers 6 and 8, respectively. A first output terminal 14 of a pair of output terminals 14 and 16 is connected to fixed contacts 6*b* and 8*b* of choppers 6 and 8, respectively. The second output terminal 16 of the pair of output terminals is connected to fixed contacts 6*e* and 8*e* of choppers 6 and 8, respectively.

Opposite sides of a capacitor 10 are connected to the movable contacts or vibrating reeds 6*c* and 6*f* of the chopper 6; similarly opposite sides of a capacitor 12 are connected to the movable contacts or vibrating reeds 8*c* and 8*f* of the chopper 8. Chopper coils 6*g* and 8*g* of choppers 6 and 8, respectively, are connected to a common AC voltage source 22 such as a 60 c.p.s. AC source.

Output terminals 14 and 16 are connected across the primary of a transformer 18. The secondary of the transformer 18 is connected across a common line 20 and the grid of an amplifier 19. It is to be understood that the amplifier 19 and the transformer 18 are merely for purposes of illustration. The amplifier 19 may, for example, be replaced with a transistor. Also, other means for coupling the output terminals 14 and 16 to the amplifier 19 may be employed.

In operation, when the AC voltage in the coil 6*g* reaches a positive peak both movable contacts 6*c* and 6*f* of the chopper 6 switch the capacitor 10 across fixed contacts 6*a* and 6*d*, thereby charging the capacitor 10 to a value dependent upon the amplitude of the DC signal in the signal lines 1. When the AC voltage in the coil 6*g* reverses and reaches a negative peak, both movable contacts 6*c* and 6*f* of the chopper 6 switch the capacitor 10 across fixed contacts 6*b* and 6*e*, thereby discharging the capacitor 10 through the primary of the transformer 18, via the output terminals 14 and 16.

The chopper 8 is wired to operate 180° out of phase with respect to chopper 6. Thus, when the AC voltage in coils 6*g* and 8*g* of the choppers 6 and 8 reaches a positive peak, the capacitor 12 is switched across fixed contacts 8*b* and 8*e* and when the AC voltage in the coils 6*g* and 8*g* reverses and reaches a negative peak the capacitor 12 is switched across fixed contacts 8*a* and 8*d*. Therefore, when the capacitor 10 is being charged the capacitor 12 is being discharged and conversely. Since opposite input terminals are connected to corresponding chopper terminals, i.e., input terminal 2 is connected to contacts 6*a* and 8*d* and input terminal 4 is connected to contacts 6*d* and 8*a*, and corresponding chopper contacts are connected to the same output termials, charges equal in amplitude but opposite in sign are transferred between input and output terminals upon activation of the choppers 6 and 8. The contacts of the choppers 6 and 8 "break before make."

The discharge currents from the capacitors 10 and 12 through the primary winding of transformer 18 induce an AC signal in the secondary winding thereof. After amplification by amplifier 19, the AC signal may then be rectified to produce a signal which is an amplified representation of the DC signal in input lines 1.

Induced AC noise on the input lines 1 cannot pass through capacitors 6 and 8 to the primary winding of transformer 18. Capacitors do not have the ability to store and transfer AC signals and therefore only the DC signal on input lines 1 produces a signal to the amplifier 19 input. Furthermore, the ability of the circuit to block AC signals is independent of the magnitude of the AC signals on the input lines 1.

Persons skilled in the art will, of course, readily adapt the general teachings of the invention to embodiments other than the specific embodiment illustrated. Accordingly, the scope of the protection afforded the invention should not be limited to the particular embodiment shown in the drawings and described above, but shall be determined only in accordance with the appended claims.

The embodiments of the invention in which an exclusive property or privilege is claimed are defined as follows:

1. A filter circuit for coupling an input signal to a load including in combination: first and second input terminals for receiving the input signal and first and second output terminals coupled to the load and separate from said first and second input terminals;

first and second capacitors;

means for alternately coupling each of said first and second capacitors across said first and second input terminals to charge said first and second capacitors with the signal; and means for alternately coupling each of said first and second capacitors with reversed signal polarities across said first and second output terminals to discharge said first and second capacitors to the load.

2. The device according to claim 1 wherein said means for alternately charging and discharging each of said capacitors comprises:

means for generating a periodic signal having first and second predetermined voltage amplitudes;

first switch means for electrically isolating said first capacitor from said first and second input terminals and said first and second output terminals in response to said second and first voltage amplitudes, respectively, and for electrically connecting said first capacitor across said first and second input terminals and said first and second output terminals in response to said first and second voltage amplitude, respectively;

second switch means for electrically isolating said second capacitor from said first and second input terminals and said first and second output terminals in response to said first and second voltage amplitudes, respectively, and for electrically connecting said second capacitor across said first and second output terminals in response to said second and first voltage amplitudes, respectively.

3. The device according to claim 1 wherein said means for alternately charging and discharging each of said capacitors comprises:

means for generating a periodic signal having first and second predetermined voltage amplitudes;

first and second dual choppers, each of said dual choppers including a pair of contacts movable in response to said first and second voltage amplitudes, first and second contacts spatially mounted with respect to one of said movable contacts and each engageable therewith responsive to said first and second voltage amplitudes, respectively, third and fourth contacst spatially mounted with respect to the other of said movable contacts and each engageable therewith responsive to said first and second voltage amplitudes, respectively;

means for connecting said first capacitor between the pair of movable contacts of said first dual chopper;

means for connecting said second capacitor between the pair of movable contacts of said second dual chopper;

means for connecting one of said first and second input terminals to the first and fourth contacts of said first and second dual choppers, respectively;

means for connecting the other of said first and second input terminals to the third and second contacts of said first and second dual choppers, respectively;

means for connecting one of said first and second output terminals to the second and first contacts of said first and second dual choppers, respectively; and means for connecting the other of said first and second output terminals to the fourth and third contacts of said first an dsecond dual choppers, respectively.

References Cited

UNITED STATES PATENTS

| | | | |
|---|---|---|---|
| 2,872,582 | 2/1959 | Norton | 307—240 X |
| 3,041,479 | 6/1962 | Sikorra. | |
| 3,192,401 | 6/1965 | Gray | 307—288 X |
| 3,387,224 | 6/1968 | Fleischer et al. | 330—9 X |
| 3,423,683 | 1/1969 | Kelsey et al. | 307—260 X |
| 3,435,256 | 3/1969 | Young | 328—67 X |

DONALD D. FORRER, Primary Examiner

R. C. WOODBRIDGE, Assistant Examiner

U.S. Cl. X.R.

307—231, 246; 330—9; 333—70